United States Patent
Bayer et al.

(10) Patent No.: US 8,034,228 B2
(45) Date of Patent: Oct. 11, 2011

(54) METHOD AND DEVICE FOR THE PRODUCTION OF COMPONENTS HAVING A THREE-DIMENSIONALLY FORMED SURFACE

(75) Inventors: Erwin Bayer, Dachau (DE); Albin Platz, Ried-Baindlkirch (DE)

(73) Assignee: MTU Aero Engines GmbH, Munich (DE)

( * ) Notice: Subject to any disclaimer, the term of this patent is extended or adjusted under 35 U.S.C. 154(b) by 1121 days.

(21) Appl. No.: 11/394,775

(22) Filed: Mar. 31, 2006

(65) Prior Publication Data
US 2006/0243601 A1 Nov. 2, 2006

(30) Foreign Application Priority Data
Mar. 31, 2005 (DE) .................. 10 2005 014 598

(51) Int. Cl.
*B23H 3/04* (2006.01)

(52) U.S. Cl. ............... 205/651; 204/224 M; 204/225; 204/229.5

(58) Field of Classification Search ............ 205/651; 204/224 M, 225, 229.5
See application file for complete search history.

(56) References Cited

U.S. PATENT DOCUMENTS

| 5,149,405 | A | | 9/1992 | Bruns et al. | |
|---|---|---|---|---|---|
| 5,833,835 | A | * | 11/1998 | Gimaev et al. | ........ 205/645 |
| 7,462,273 | B2 | * | 12/2008 | Mielke | ............ 205/651 |

FOREIGN PATENT DOCUMENTS

| EP | 0 292 213 A1 | 11/1988 |
|---|---|---|
| EP | 1 430 983 A2 | 6/2004 |
| GB | 2 270 644 A | 3/1994 |

* cited by examiner

*Primary Examiner* — Alexa D. Neckel
*Assistant Examiner* — Nicholas A. Smith
(74) *Attorney, Agent, or Firm* — Crowell & Moring LLP

(57) ABSTRACT

A method and device for the production of components having a three-dimensionally formed surface by a lowering operation with an electrochemical ablation process, namely a Precise Electro Chemical Machining (PECM) process, is disclosed. The method includes the steps of: a) providing a specially pre-formed workpiece featuring a specific dimensional allowance; b) providing at least one working electrode, in which case the contour of the working electrode, or of each working electrode, is adapted to the contour of the three-dimensionally formed surface to be produced; and c) lowering the three-dimensionally formed surface by placing the pre-formed workpiece and the working electrode, or each working electrode, in an electrolyte and by applying an electrical voltage or an electrical current, in which case the working electrode, or each working electrode, is moved in the sense of a circular advance motion in the direction toward the workpiece.

13 Claims, 4 Drawing Sheets

METHOD AND DEVICE FOR THE PRODUCTION OF COMPONENTS HAVING A THREE-DIMENSIONALLY FORMED SURFACE

This application claims the priority of German Patent Document No. 10 2005 014 598.1, filed Mar. 31, 2005, the disclosure of which is incorporated by reference herein.

BACKGROUND AND SUMMARY OF THE INVENTION

The invention relates to a method for the production of components such as, for example, gas turbine components, or of gear wheels, or of implants used in medical technology, which have a three-dimensionally formed surface. Further, the invention relates to a device for the production of components having a three-dimensionally formed surface.

Gas turbine rotors used in aircraft engineering increasingly are configured as integrally bladed rotors, in which case such integrally bladed rotors represent the rotor blades as an integral part of the rotor or a rotor base element. Such integrally bladed rotors are also referred to as a blisk (bladed disk) or as a bling (bladed ring), i.e., depending on whether a disk-shaped or a ring-shaped rotor base element is used. Integrally bladed gas turbine rotors consist of metal materials, in particular of materials that are difficult to machine such as titanium base alloys, nickel base alloys or cobalt base alloys. Referring to prior art, the production of three-dimensionally formed surfaces or aerodynamic structures on the rotor blades of such integrally bladed gas turbine rotors involves machining processes, such as, for example, milling processes. The production of three-dimensionally formed surfaces or aerodynamic structures on the rotor blades of integrally bladed rotors that consist of materials that are difficult to machine by means of milling processes is highly complex and extremely time-intensive, as well as cost-intensive. In addition, as a rule, subsequent finishing work is required.

The object of the present invention is to provide a novel method and a corresponding device for the production of components having a three-dimensionally formed surface.

In accordance with the invention, the method comprises the following steps: a) providing a specially pre-formed workpiece featuring a specific dimensional allowance; b) providing at least one working electrode, in which case the contour of the working electrode, or of each working electrode, is adapted to the contour of the three-dimensionally formed surface to be produced; c) lowering the three-dimensionally formed surface by placing the pre-formed workpiece and the working electrode, or each working electrode, in an electrolyte and by applying an electrical voltage or an electrical current, in which case the working electrode, or each working electrode, is moved in the sense of a circular advance motion in the direction toward the workpiece.

Referring to the present invention, a simple and quick option for the production of three-dimensionally formed surfaces or aerodynamic structures of workpieces is provided, the production being characterized by high precision and accuracy in the micrometer range. The surfaces or aerodynamic structures can be produced with such accuracy that subsequent processing becomes unnecessary.

Referring to an advantageous embodiment of the invention, the circular advance motion of the working electrode, or of each working electrode, in the direction toward the workpiece is superimposed by a pulsing or periodic movement in the direction of the advance motion, in order to expose gaps between the working electrode, or between each of the working electrodes, and the component for a forced rinsing of the gaps with electrolyte. Optionally, the circular advance motion of the working electrode, or of each working electrode, in the direction toward the workpiece can additionally be superimposed by a linear advance motion.

Preferably, the three-dimensionally formed surfaces produced with the inventive method are suction-side contours and pressure-side contours on the rotor blades of an integrally bladed rotor; whereby, in order to achieve this, an integrally bladed rotor of a rotor base element and rotor blades being integrally mounted to the base element and featuring a specific dimensional allowance are provided; whereby, in order to achieve this, furthermore, at least two working electrodes are provided for at least one rotor blade, a contour of one of the working electrodes being adapted to a contour of a suction-side contour to be created and a contour of the other working electrode being adapted to a contour of a pressure-side contour to be created; and whereby, in order to achieve this, furthermore, for the simultaneous lowering of the suction-side contour and the pressure-side contour in the region of at least one rotor blade, the corresponding working electrodes are moved in the sense of an opposite circular advance motion in the direction toward the respective rotor blade.

As a result of the option of making the aforementioned method a parallel operation, i.e., as a result of the simultaneous production of aerodynamic structures on several rotor blades, the processing time of integrally bladed rotors can be reduced, so that significant productivity increases can be achieved.

BRIEF DESCRIPTION OF THE DRAWINGS

Preferred developments of the invention are provided in the following description. Exemplary embodiments of the invention are explained in detail with respect to the drawings, without being restricted thereto.

DETAILED DESCRIPTION OF THE DRAWINGS

Referring to FIGS. 1 through 4, the present invention will be explained in greater detail hereinafter.

Figure 1:
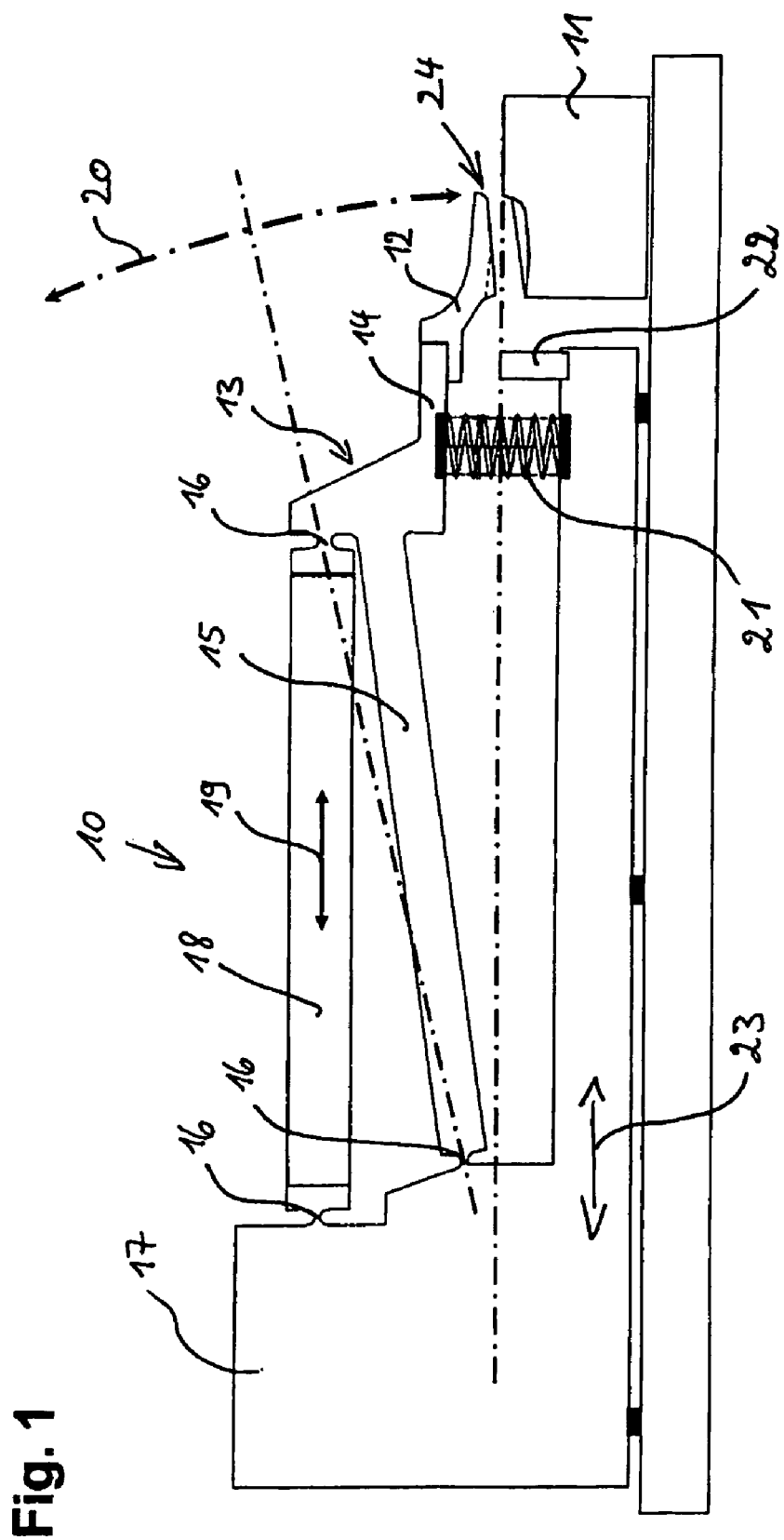
FIG. 1 shows a device in accordance with the invention for the production of components having a three-dimensionally formed surface, in a schematic illustration, together with a workpiece in accordance with a first exemplary embodiment of the invention.

FIG. 1 shows a first exemplary embodiment of an inventive device 10 for the production of components having a three-dimensionally formed surface, together with a workpiece 11, in which case the workpiece 11 is a pre-formed workpiece featuring a specific dimensional allowance.

In the shown exemplary embodiment, the inventive device 10 comprises a working electrode 12, in which case the contour of the working electrode 12 is adapted to the contour of the three-dimensional surface of the component to be produced. The working electrode 12 is mounted to or supported by a support 13. The support 13 comprises a mounting section 14 for the working electrode 12 and comprises a lever arm 15.

The mounting section 14 is rigidly connected with the lever arm 15. Via a solid joint 16, the lever arm 15 is rigidly connected with a structure or a frame 17 of the inventive device 10. The frame 17 is configured in a torsion-proof manner in two dimensions. Referring to FIG. 1, a control element 18 acts on the lever arm 15. Via solid joints 16, the control element 18 is hinged, on one side, to the lever arm 15 and, on the other side, to the frame 17. By way of the control element 18, the lever arm 15, and thus the working electrode 12, can be moved following a circular advance motion in the direction toward the workpiece 11.

Preferably, the control element 18 is configured as a piezo controller, in which case the piezo controller can effect a lengthening or shortening in the sense of the double arrow 19. The lengthening or shortening of the control element 18 configured as a piezo controller is converted by the lever arm 15 into a pivoting movement of the working electrode 12 along a circular path 20. In order to lower a three-dimensionally formed surface on the workpiece 11, thus, in accordance with the inventive device 10, the working electrode 12 is moved following a circular advance motion in the direction toward the workpiece 11. In so doing, the movement of the working electrode 12 is against the spring force provided by a spring element 21, in which case the spring element 21 acts, on one side, on the frame 17 and, on the other side, on the mounting section 14 of the pivotable support 13.

Referring to FIG. 1, the pivoting movement of the working electrode 12 is limited by a stop 22 in the direction of the workpiece 11. In so doing, the stop 22 is a component of the frame 17 of the inventive device 10. The entire inventive device 10 can be moved, together with the working electrode 12, in the sense of the double arrow 23 in a linear manner relative to the workpiece 11 that is to be processed, in order to align the device 10 and thus the working electrode 12 in a working position relative to the workpiece 11.

With the use of the inventive device 10 shown in FIG. 1, a three-dimensional surface on a workpiece 11 can be lowered in a fast, simple and highly precise manner. To achieve this, the process in accordance with the invention is as follows: First, a workpiece 11 is provided, in which case the workpiece 11 has been pre-formed considering the component to be produced, the component featuring a dimensional allowance in order to produce the desired three-dimensionally formed surface by lowering the surface by means of an electrochemical ablation process. In the same way, the device 10 comprising the working electrode 12 is provided, in which case the contour of the working electrode 12 is adapted to the contour of the three-dimensionally formed surface to be produced. The three-dimensionally formed surface is lowered by Precise Electro Chemical Machining (PECM) in such a manner that at least the working electrode 12 and the workpiece 11 are positioned in an electrolyte. Furthermore, an electrical voltage or an electrical current is applied, in which case then the working electrode 12 is moved in the sense of the circular advance motion or pivot motion in the direction toward the workpiece 11 as indicated by the arrow 20. The solid joint 16 provided between the lever arm 15 of the support 13 and the frame 17, in so doing, acts as the fulcrum for the support 13 and thus the working electrode 12.

In order to lower a three-dimensional surface of a workpiece 11, therefore, the inventive device 10 and thus the working electrode 12 are moved in the sense of an advance motion (arrow 23) in the direction toward the workpiece 11 and pre-positioned opposite the workpiece 11 in such a manner that a gap 24 is formed between the working electrode 12 and the workpiece 11, the gap having a width between 1 mm and 2 mm. The electrolyte can flow through the gap 24 between the working electrode 12 and the workpiece 11. Then, an electrical current, preferably a pulsing direct current, or an electrical voltage, preferably a pulsing direct voltage, is applied to the working electrode 12, and the working electrode 12 is moved by means of the control element 18 in the sense of a circular pivoting movement or advance movement toward the workpiece 11. In so doing, the working electrode 12 is pivoted at a rate of between 0.01 mm/min and 2.50 mm/min.

This circular advance movement of the working electrode 12 is preferably superimposed by a pulsing or periodic movement. By way of this pulsing or periodic movement that is superimposed on the circular advance movement, the gap 24 is forcibly rinsed with electrolyte. Referring to the exemplary embodiment of FIG. 1, this pulsing or periodic movement of the working electrode 12 is also effected by control element 18. As a result of this, the gap 24 between the working electrode 12 and the workpiece 11 is periodically made smaller or larger. In so doing, the amplitude of the pulsing or periodic movement ranges preferably between 0.01 mm and 2.5 mm.

Referring to FIG. 1, the end of the electrochemical lowering process or ablation process is reached when the working electrode 12 has been moved in the sense of a circular advance movement toward the workpiece 11 in such a manner that the working electrode 12 abuts against the stop 22, and thus a continued pivoting advance of the working electrode 12 toward the workpiece 11 is no longer possible. In this case, the three-dimensionally formed surface to be produced is lowered completely and the inventive device 10 can preferably be moved away or removed from the workpiece 11 after the working electrode 12 has been pivoted away.

As already mentioned, an electrical current or an electrical voltage is used for lowering, preferably a pulsed direct current or a pulsed direct voltage. In so doing, the pulse frequency ranges preferably between 1 Hz and 10 kHz, in which case back and forth switching between current potentials or voltage potentials preferably takes place during pulse operation.

Figure 2:
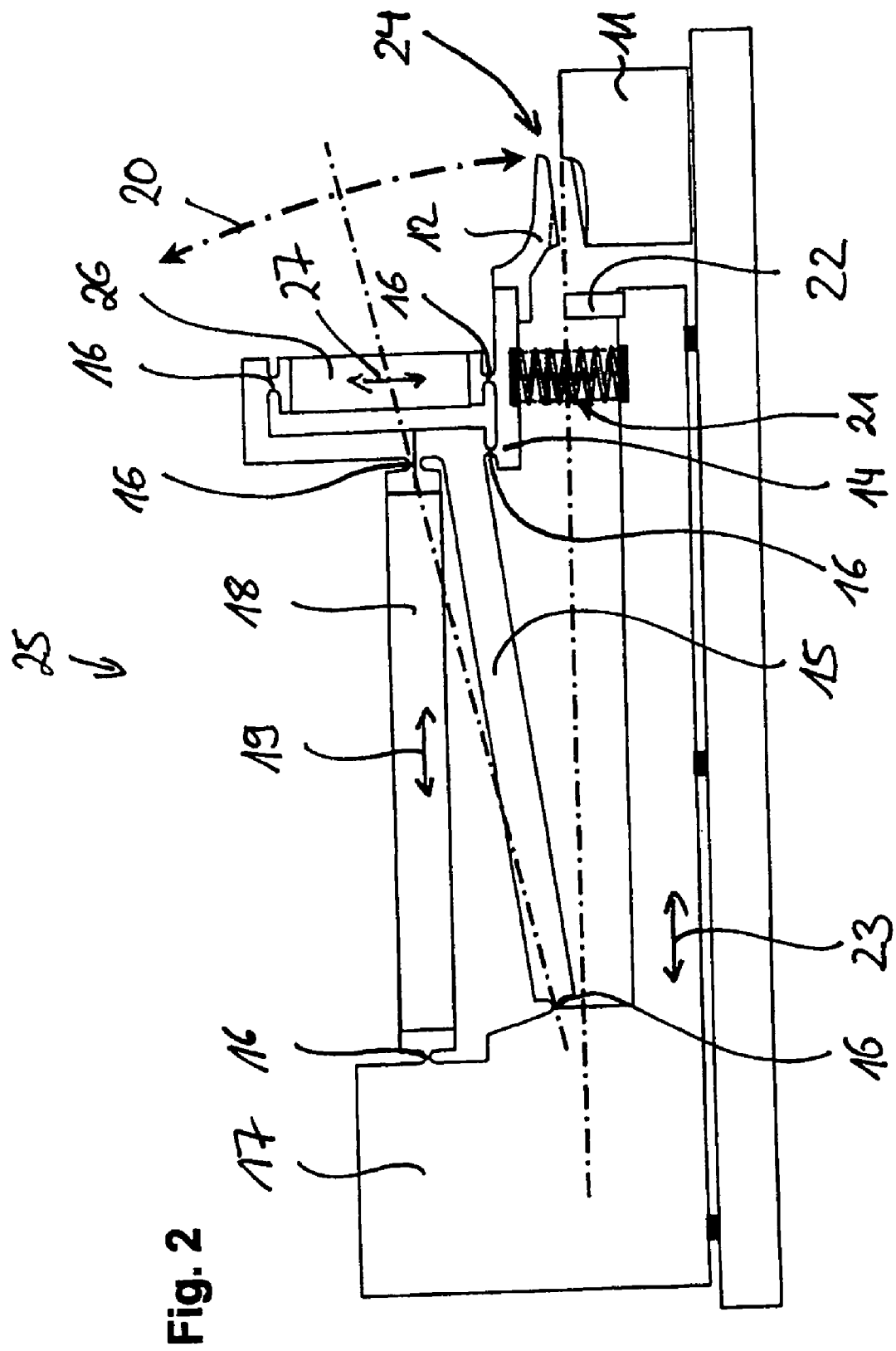
FIG. 2 shows a device in accordance with the invention for the production of components having a three-dimensionally formed surface, in a schematic illustration, together with a workpiece in accordance with a second exemplary embodiment of the invention.

Referring to FIG. 2, a second exemplary embodiment of an inventive device 25 is shown, in which case the device 25 of FIG. 2 substantially corresponds to the device 10 of FIG. 1. Therefore, in order to avoid unnecessary repetition, the same assemblies have the same reference numbers. Below, only those details will be discussed which distinguish the exemplary embodiment of FIG. 2 from the exemplary embodiment of FIG. 1. Referring to the exemplary embodiment of FIG. 2, the inventive device 25 comprises, in addition to the control element 18 which ensures the circular pivoting movement (arrow 20) of the working electrode 12 relative to the workpiece 11, an additional control element 26. The control element 26 is again configured as a piezo controller and can perform a lengthening or shortening motion in the sense of the double arrow 27. In the exemplary embodiment of FIG. 2, the control element 26 is used to apply the pulsing or periodic movement which is superimposed on the circular advance movement in order to effect a forced rinsing of the gap 24 with electrolyte. The advantage of this variant is that, due to the synchronized superimposition of the circular advance movement effected by the control element 18 with the pulsing or periodic movement caused by the control element 26, the usually sinusoidal, pulsing or periodic movement can be converted into a trapezoidal movement with steep sides. The lowering process can then be performed in such a manner that there is no relative movement between the workpiece 11 and the working electrode 12 during the time when the lowering current is switched on, and that the entire lowering process takes place in a quasi-stationary state with a constant gap 24.

The circular advance movement of the working electrode 12 in the direction toward the workpiece (arrow 20) and the pulsing or periodic movement superimposed on the latter can further be superimposed by a linear advance movement (arrow 23) of the working electrode 12.

Figure 3:
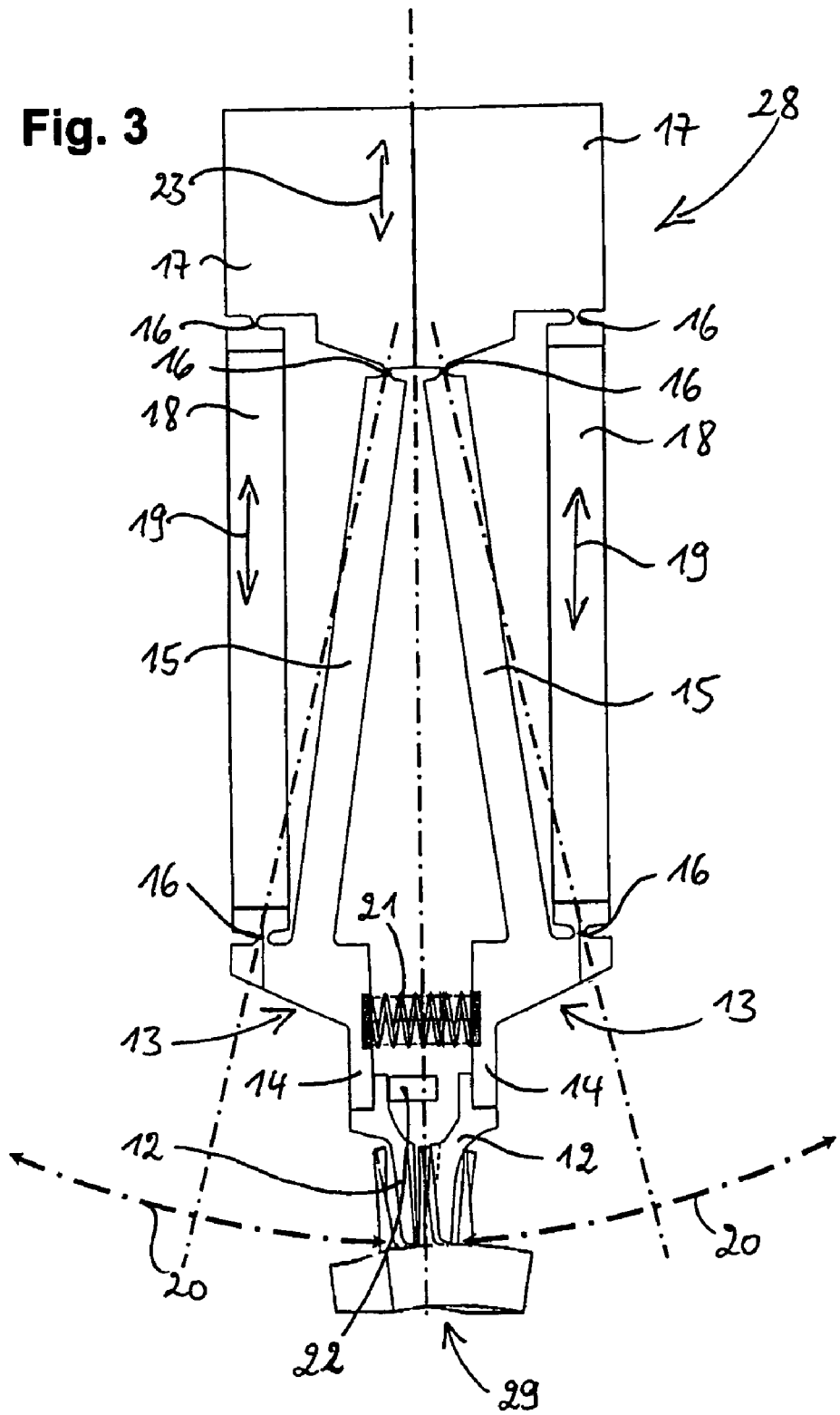
FIG. 3 shows a device in accordance with the invention for the production of components having a three-dimensionally formed surface, in a schematic illustration, together with a workpiece in accordance with a third exemplary embodiment of the invention.
Figure 4:
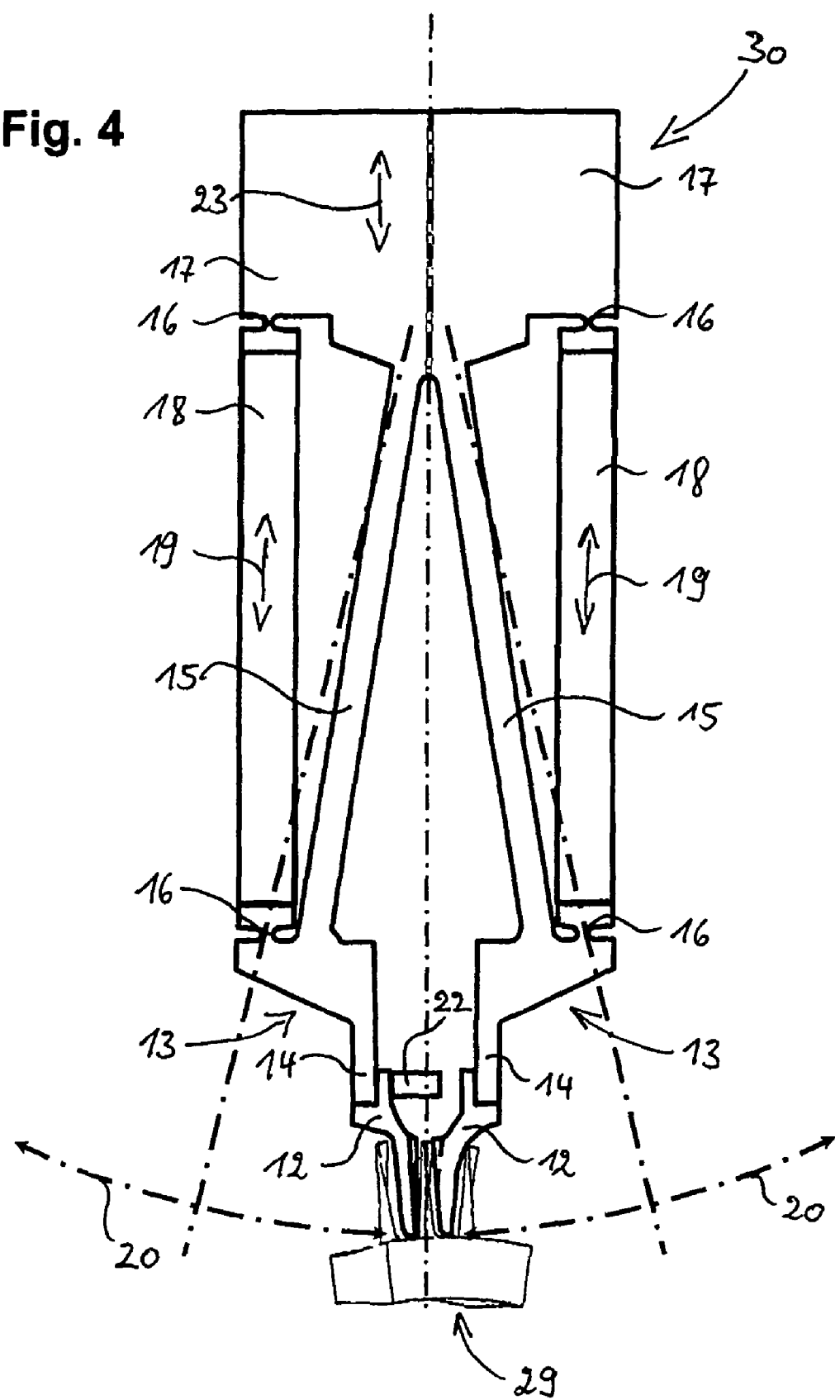
FIG. 4 shows a device in accordance with the invention for the production of components having a three-dimensionally formed surface, in a schematic illustration, together with a workpiece in accordance with a fourth exemplary embodiment of the invention.

Referring to FIG. 3, another exemplary embodiment of the inventive device 28 is shown, in which case the device 28 of FIG. 3 is used for lowering aerodynamic structures on an integrally bladed rotor 29. The aerodynamic structures are produced on the integrally bladed rotor 29, preferably as suction-side contours and pressure-side contours of the rotor blades of the integrally bladed rotor 29.

Referring to FIG. 3, the device 28 is composed of two devices as in FIG. 1 that are positioned in a laterally inverse manner relative to each other. According to that, the device 28 of the exemplary embodiment of FIG. 3 comprises two working electrodes 12, in which case the contour of one of the two working electrodes 12 is adapted to the contour of the suction-side contour to be produced and the contour of the other working electrode 12 is adapted to the contour of the pressure-side contour to be produced of a rotor blade of an integrally bladed rotor 29. Each of the two working electrodes 28 is mounted to or supported by a support 13, in which case respectively one control element 18 acts on the supports 13. With the use of the control elements 18, the supports and thus the working electrodes 12 can be moved in the sense of an opposing circular pivoting movement or advance movement toward each other and away from each other. In so doing, both working electrodes 12 on the circular paths as indicated by arrows 20 are pivoted about parallel axes. Referring to FIG. 3, the control elements 18 are again configured in such a manner that the opposing pivoting movements of the two working electrodes 12 can be superimposed by a pulsing or periodic movement, by means of which the distance of the working electrodes from the rotor blade can be increased or decreased in a pulsing or periodic manner.

Referring to the exemplary embodiment of FIG. 3, a shared spring element 21 acts on the two mounting sections 14 of the supports 13. Further, only one single stop 22 is provided, which limits the advance movements of the working electrodes 12 toward each other in the sense of an end position for the lowering process.

Referring to FIG. 4, another exemplary embodiment of an inventive device 30 for the production of components having a three-dimensionally formed surface is shown, in which case the device 30 of FIG. 4 is again used for lowering suction-side contours and pressure-side contours on the rotor blades of an integrally bladed rotor 29 and is composed of two devices positioned in a laterally reverse manner relative to each other similar to FIG. 3. Therefore, the same reference numbers are again used for the same assemblies, and reference can be made to the above explanations. In contrast with FIG. 3 and referring to the exemplary embodiment of FIG. 4, the lever arm 15 is configured as a spring-steel bar that is rigidly connected with the frame 17, thus eliminating the spring 21.

With the use of the inventive devices shown by FIGS. 1 through 4 and with the use of the inventive method, a highly accurate, simple and rapid production of three-dimensionally formed surfaces of components, in particular of suction-side contours and pressure-side contours on rotor blades of integrally bladed rotors is possible. In so doing, the achieved accuracy is in the micrometer range, so that subsequent processing can be ommited. The inventive device is characterized by a compact and simple design.

LIST OF REFERENCE NUMBERS

10 Device
11 Workpiece
12 Working electrode
13 Support
14 Mounting section
15 Lever arm
16 Solid joint
17 Frame
18 Control element
19 Double arrow
20 Circular path
21 Spring element
22 Stop
23 Double arrow
24 Gap
25 Device
26 Control element
27 Double arrow
28 Device
29 Workpiece/rotor
30 Device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for production of components having a three-dimensionally formed surface by a lowering operation with an electrochemical ablation process, namely a Precise Electro Chemical Machining (PECM) process, comprising the following steps:
    a) providing a specially pre-formed workpiece featuring a specific dimensional allowance;
    b) providing at least one working electrode, in which case a contour of the working electrode, or of each working electrode, is adapted to a contour of the three-dimensionally formed surface to be produced; and
    c) lowering the three-dimensionally formed surface by placing the pre-formed workpiece and the working electrode, or each working electrode, in an electrolyte and by applying an electrical voltage or an electrical current, in which case the working electrode, or each working electrode, is moved in a sense of a circular pivoting advance motion in a direction toward the workpiece, wherein the circular pivoting advance motion of the working electrode, or of each working electrode, in the direction toward the workpiece is superimposed by a pulsing or periodic movement of the working electrode, or of each working electrode in the direction of the advance motion;
wherein the three-dimensionally formed surface is a suction-side contour and a pressure-side contour on a rotor blade of an integrally bladed rotor; wherein an integrally bladed rotor of a rotor base element and a rotor blade being integrally mounted to the base element and featuring a specific dimensional allowance are provided; wherein, furthermore, at least two working electrodes are provided for the rotor blade, a contour of one of the working electrodes being adapted to a contour of a suction-side contour to be created and a contour of the other working electrode being adapted to a contour of a pressure-side contour to be created; and wherein, furthermore, for a simultaneous lowering of the suction-side contour and the pressure-side contour on the rotor blade, the two working electrodes are moved in a sense of an opposite circular advance motion in the direction toward the rotor blade.

2. The method as claimed in claim 1, wherein the pulsing or periodic movement is a vibration movement performed at an amplitude between 0.01 mm and 2.5 mm.

3. The method as claimed in claim 1, wherein the circular advance movement of the working electrode, or of each working electrode, for lowering the three-dimensionally formed surface is performed at a rate of between 0.01 mm/min and 2.5 mm/min.

4. The method as claimed in claim 1, wherein for the lowering step, the electrical current is a pulsed direct current and the electrical voltage is a pulsed direct voltage, in which case a pulse frequency for the direct current or the direct voltage ranges between 1 Hz and 10 kHz.

5. The method as claimed in claim 1, wherein the working electrodes are pivoted opposite each other about parallel axes in order to lower the suction-side contour and the pressure-side contour on the rotor blade.

6. The method as claimed in claim 1, wherein the circular advance movement of the working electrodes for lowering the suction-side contour and the pressure-side contour on the rotor blade occurs at a uniform speed.

7. A device for production of components having a three-dimensionally formed surface by a lowering operation with an electrochemical ablation process, namely a Precise Electro Chemical Machining (PECM) process, the device comprising at least one working electrode adapted to a contour of the surface to be produced, in which case the working electrode, or each working electrode, is supported on a support in such a manner that the working electrode is movable in a sense of a circular pivoting advance movement toward the component, wherein a control member associated with the circular pivoting advance movement of the working electrode in a direction of the component superimposes a pulsing or periodic movement of the working electrode on the circular pivoting advance movement, wherein, for the production of a suction-side contour and a pressure-side contour on a rotor blade of an integrally bladed rotor, at least two working electrodes, namely a first working electrode which is adapted to the contour of the suction-side contour to be produced and a second working electrode which is adapted to the contour of the pressure-side contour to be produced, wherein each of the working electrodes is respectively supported on a support in such a manner that the working electrodes are movable in an opposing and circular advance movement in a direction toward the component, as well as pivoted toward each other and away from each other.

8. The device as claimed in claim 7, wherein the support for the working electrode is supported in a two-dimensional torsion-proof frame in such a manner that the support and thus the corresponding working electrode are movable by way of at least one control element acting on the support following a circular advance movement in a direction of the workpiece component.

9. The device as claimed in claim 7, wherein at least one stop limits an end position of the working electrode, or of each of the working electrodes, during the movement of the electrodes along the circular pivoting advance movement in a direction toward the component.

10. A device for production of components having a three-dimensionally formed surface by a lowering operation with an electrochemical ablation process, namely a Precise Electro Chemical Machining (PECM) process, the device comprising at least one working electrode adapted to a contour of the surface to be produced, in which case the working electrode, or each working electrode, is supported on a support in such a manner that the working electrode is movable in a sense of a circular pivoting advance movement toward the component, wherein a control member associated with the circular pivoting advance movement of the working electrode in a direction of the component superimposes a pulsing or periodic movement of the working electrode on the circular pivoting advance movement, wherein the support includes a lever arm and wherein the lever arm is configured either as a spring-steel bar or is connected with a frame via a solid joint.

11. A method for production of a three-dimensional surface on a component, comprising the steps of:
    placing an electrode and the component in an electrolyte;
    applying an electrical voltage or an electrical current to the electrode;
    moving the electrode toward the component by a support, wherein the support includes a lever arm and wherein the lever arm is configured either as a spring-steel bar or is connected with a frame via a solid joint and wherein the electrode is moved in a direction toward the component on a circular pivoting path; and
    superimposing a pulsing or periodic movement of the working electrode on the circular pivoting path in the direction toward the component;
    wherein the electrode includes a contour which corresponds to the three-dimensional surface to be produced on the component.

12. A device for production of a three-dimensional surface on a component, comprising:
    an electrode, wherein the electrode includes a contour which corresponds to the three-dimensional surface to be produced on the component; and
    a support connected to the electrode, wherein the support moves the electrode toward the component, and wherein the electrode is moved in a direction toward the component on a circular pivoting path and wherein the circular pivoting path in the direction toward the component is superimposed by a pulsing or periodic movement of the electrode in the direction toward the component, and further wherein the support includes a lever arm and wherein the lever arm is configured either as a spring-steel bar or is connected with a frame via a solid joint.

13. The device as claimed in claim 12, further comprising a second electrode, wherein the second electrode includes a second contour which corresponds to a second three-dimensional surface to be produced on the component.

* * * * *